United States Patent
Gabrys

(10) Patent No.: US 6,720,674 B1
(45) Date of Patent: Apr. 13, 2004

(54) DEVICE FOR PREVENTION OF POWER INTERRUPTIONS

(75) Inventor: Christopher W. Gabrys, Reno, NV (US)

(73) Assignee: Indigo Energy, Inc., Napa, CA (US)

( * ) Notice: Subject to any disclaimer, the term of this patent is extended or adjusted under 35 U.S.C. 154(b) by 124 days.

(21) Appl. No.: 10/096,602

(22) Filed: Mar. 12, 2002

Related U.S. Application Data

(60) Provisional application No. 60/275,252, filed on Mar. 12, 2001.

(51) Int. Cl.[7] ................................................ H02K 7/02
(52) U.S. Cl. .......................................... 307/68; 318/161
(58) Field of Search ............................... 307/68, 46, 48, 307/64, 85–87; 318/161, 254, 439, 138, 800–802, 434

(56) References Cited

U.S. PATENT DOCUMENTS

| | | | |
|---|---|---|---|
| 4,465,943 A | 8/1984 | Risberg | |
| 4,707,774 A | 11/1987 | Kajita | |
| 5,705,902 A | 1/1998 | Merritt et al. | |
| 5,955,816 A | 9/1999 | Clifton et al. | |
| 6,239,513 B1 * | 5/2001 | Dean et al. | ................... 307/64 |
| 6,240,337 B1 | 5/2001 | Marr, Jr. et al. | |
| 6,262,505 B1 | 7/2001 | Hockney | |
| 6,639,370 B1 * | 10/2003 | Gabrys | ........................ 318/161 |

* cited by examiner

Primary Examiner—Gregory J. Toatley, Jr.
(74) Attorney, Agent, or Firm—J. Michael Neary

(57) ABSTRACT

A device for preventing power interruptions to a DC bus includes a flywheel supported on bearings for rotation inside a chamber having a drag reducing atmosphere within a container. During charging, the flywheel is driven by an integral brushless permanent magnet excited motor/generator for storing energy, and during retrieval of the stored energy, the flywheel drives and is decelerated by the same motor generator. A closed loop operated synchronous inverter delivers synchronous electrical power to the armature coils of the motor/generator for accelerating the motor/generator. A rectifier connects the armature coils of the motor/generator to the DC bus. Upon an interruption of primary utility power, the motor/generator supplies unregulated voltage power to the DC bus through the rectifier, and the voltage of the unregulated voltage power to the DC bus falls as the flywheel slows during discharge of useable energy from the flywheel through the motor/generator to the DC bus. The amount of usable energy delivered to the DC bus during a utility power interruption is maximized by the combination of a low voltage drop in the armature coils and by the flywheel having sufficient inertia to reduce the rate of decay of the back emf of the motor/generator.

20 Claims, 13 Drawing Sheets

DEVICE FOR PREVENTION OF POWER INTERRUPTIONS

This is related to U.S. Provisional Application No. 60/275,252 filed on Mar. 12, 2001 and entitled "Device for Prevention of Short Term Telecommunication Power Interruptions".

The invention pertains to prevention of power interruptions, and more particularly a flywheel energy storage device, for preventing power loss to a DC bus, having high reliability, long life, and is more tolerant to extreme operating environments and load demands than conventional electrochemical batteries. The flywheel uses a brushless permanent magnet motor/generator powered by a closed loop operated synchronous inverter to charge, and an unregulated rectifier is used for discharging to the DC bus. In certain applications, the invention can provide a lower cost, simpler and more reliable flywheel energy device than competing conventional regulated flywheel systems.

BACKGROUND OF THE INVENTION

Power reliability, in the area of telecommunications in particular, is of utmost importance. The electric utility grid in the United States is currently 99.9% reliable. This means that the utility power is down an average of 8 hours per year. With the advent of the Internet, e-commerce, and widespread computer connectivity, this loss of power for telecommunications is currently deemed unacceptable. To prevent loss of telecommunications during interruption of the utility grid power, uninterruptible power supplies (UPS) are installed at distributed locations for back up. The UPS that are currently available commercially and accepted as the standard, all rely on lead acid batteries for storage of the back up energy. Valve-regulated lead acid batteries, particularly used in outside plant locations, have terrible reliability as well as longevity properties due to the lack environmental control. Furthermore, they require periodic maintenance and replacement.

Flywheel energy storage systems are now becoming recognized as having the potential to offer more reliable reserve power than conventional electrochemical batteries. However, current designs are usually more expensive and not suitable for all types of applications. In the area of telecommunications, there exists a need for a very low cost device that can be deployed widespread and can prevent power interruptions both in locations where auxiliary generating means are not available and for ride-thru until an auxiliary generator has time to start. Such a device could power outside plant network electronics with the standard direct current telecommunications voltages.

In most designs of flywheel energy systems, power from the flywheel generator is regulated to advantageously increase the amount of energy that can be extracted from the rotating flywheel. The voltage of a motor/generator, whether separate units or combined, is directly proportional to the rotational speed, so as the speed of the flywheel slows during a discharge, the voltage falls and ultimately decreases to below a useable level. To reduce the cost, weight and size of the flywheel, some regulation method is employed so that the flywheel generator can supply constant voltage, even as the speed of the flywheel is slowing. Two methods to accomplish this regulation are through electronic switching or through the use of a variably energizable field coil such as in an alternator type motor/generator.

For permanent magnet type motor/generators, electronic switching can be done in a motor drive inverter such that it is made to operate in $4^{th}$ quadrant mode during discharging. The motor drive thereby actively boosts and regulates the voltage from the generator during discharging so as to maintain a constant output voltage for a wide speed range, extracting most of the energy from the flywheel. Unfortunately, in some applications, especially high power ones, the cost of the motor drive to handle the high power discharge can be high. This is despite the fact that charging in most applications can be satisfactorily accomplished at a slower rate with a low power motor drive. The output switching regulation also incurs switching losses.

A second method for electronic output voltage regulation is to use a separate wide range DC-DC converter. As the flywheel speed falls, the converter maintains a constant voltage to a DC bus. This method can also extract almost all of the energy from the flywheel; however, it can suffer equally from high power electronics costs as the $4^{th}$ quadrant operated method. Likewise, the efficiency can be comparable.

To reduce the cost of providing output voltage regulation, an alternator type motor/generator or one with a variably excitable field coil can be employed. Since the output voltage from a generator is a function of both the speed and the field flux density, the output voltage can be maintained constant as the flywheel slows by increasing power to the field coil. A simple and more reliable method for extracting up to 90% of the flywheel's energy is achieved. However, to control the output, a field controller is used which continuously consumes power and adds some cost along with the motor/generator structure. This method can also provide another potential path for system failure.

SUMMARY OF THE INVENTION

The invention provides a high reliability flywheel energy storage device for preventing power interruptions to a DC bus. The device has longer life and is more tolerant of extreme operating environments and high power load demands than conventional electrochemical batteries. In certain applications, this invention can provide a lower cost, simpler and more reliable flywheel energy device than competing conventional regulated flywheel systems. This can be true particularly in flywheel system applications where the cost of the flywheel is a smaller portion of the complete system, where output power regulation electronics costs are significant, or where the size and weight of the flywheel system is not of significant importance.

The device uses a flywheel with an attached or integral permanent magnet brushless motor/generator. The motor/generator is electrically energized by a closed operated synchronous inverter that supplies synchronous charging power to the armature coils to accelerate the flywheel to normal operating speed. Because flywheel can be satisfactorily charged or accelerated at a low rate, the input power to the flywheel during charging can be substantially lower than the output power from the flywheel during discharging. For this reason, and also because the synchronous inverter is not required to switch or boost the unregulated output voltage, the synchronous inverter can be made small to save substantial costs, if desired. During an interruption of primary utility power, the flywheel motor/generator supplies unregulated voltage power to the DC bus through a rectifier that connects the armature coils to the DC bus. As the flywheel slows, the voltage at the DC bus falls, and eventually falls to below a useable level. Use of such a flywheel system without regulation to extract more energy from the flywheel by allowing extraction to low speeds is contrary to the conventions well known in the art. However, the amount of the usable energy delivered to the DC bus by the device can be increased the by the combination a low voltage drop in the armature coils of the motor/generator and by building the flywheel with sufficient inertia to reduce the rate of decay of the back emf of the motor/generator to the rate desired for the application.

Another aspect of the invention is the fact, generally overlooked in this industry, that most, if not all, equipment that currently is backed up by electrochemical batteries, is made to operate on a varying range of voltage. This is true because the voltage of batteries varies significantly with their state of charge. For lead acid batteries, the voltage swing from charging to discharge can be 25% or more. This allows some range of voltage and an upper speed range in which the flywheel can discharge useable energy to the load without voltage regulation. Hence, a constant output voltage from the flywheel system for these applications is not required. Adding to these facts are that, although the voltage of a motor/generator is linearly proportional to its operating speed, the energy stored is proportional to the square of its operating speed. A small allowable operating voltage range can allow a proportionally larger extraction of the flywheel's energy, because much of the energy stored in the spinning flywheel is extracted at the top end of the flywheel's speed range.

The voltage drop in the armature coils is the result of the discharge current multiplied by the resistance or impedance of those coils, which subtracts directly from the fully charged motor/generator back emf reducing extractable energy at the instant discharging starts. In one a preferred embodiment, to insure a low voltage drop in the motor/generator, the armature coils are designed with an electrical resistance per phase, R, in ohms, equal to:

$$R \leq 0.15 \, (V/I)$$

where V is the normal DC bus voltage, in volts, during normal operation of the primary utility power, and I is the normal current, in amps, through the DC bus during normal operation of the primary utility power.

In a second embodiment, the rate of slowing of the flywheel is reduced by designing the flywheel for capability of supplying useable power to the DC bus for a time, T, in seconds by building the flywheel with a rotational moment of inertia, IN, in kg m$^2$, and normal operating speed, w, in radians per second, such that:

$$IN \geq 3.6 \, V \, I \, T/w^2.$$

Alternatively, the flywheel device delivers useable power to the DC bus only in the speed range from the normal operating speed to some lower speed that is greater than 60% of the normal operating speed.

To attain these conditions, a much larger flywheel is used for a given energy delivery than those well known in the art, and hence is contrary to prior teachings. The cost, weight and size of the flywheel can be substantially increased even by a factor of two or more in some cases. However, it has been found that of the numerous types of flywheel systems and their numerous applications, that the invention can, in some applications, offer substantial reduction in complete system cost, standby power consumption, and an increase in reliability and energy delivery efficiency. This is particularly true in applications where the flywheel cost is a smaller portion of the system cost, the electronics regulation costs are substantial, and where the flywheel size and weight are not of considerable importance. One potential application is in low cost distributed telecommunications network power systems while others exist in high power ride-thru for generator sets.

DESCRIPTION OF THE PREFERRED EMBODIMENT

Figure 1:
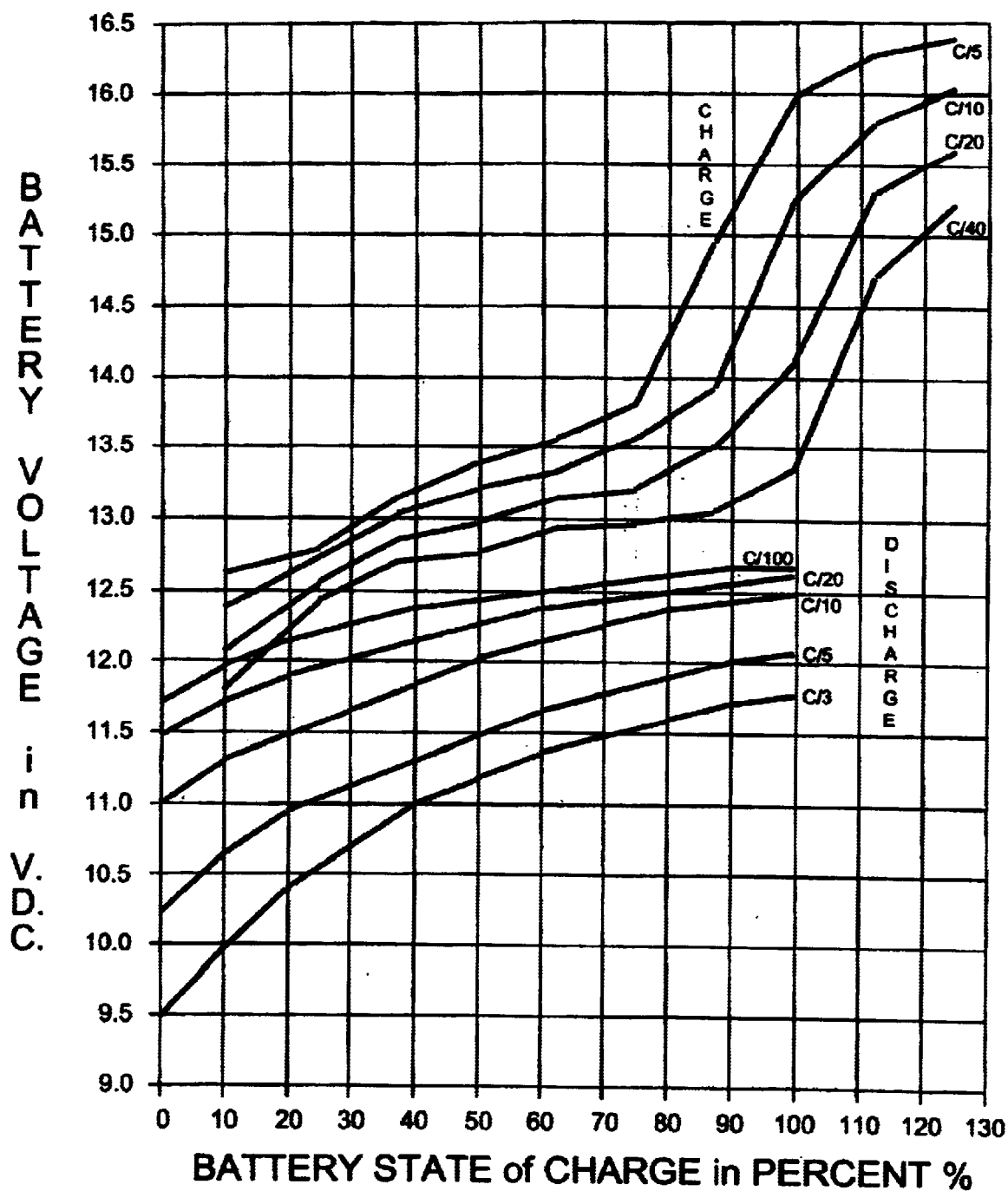
FIG. 1 is a plot of battery voltage versus the state of charge for charging and discharging for lead acid batteries.

Turning now to the drawings, wherein like reference characters designate identical or corresponding parts, and more particularly to FIG. 1 thereof a plot of the voltage of a lead acid battery is shown as a function of its level of charge during charging and discharging. As can be seen, the battery's voltage varies widely from charging to 100% charge and discharging to close to zero charge, although deep very discharging can damage the battery. For a 20 hour rate charging, C/20, the battery voltage is 14.1 volts at 100% charge. Likewise, the battery voltage drops to only 10 volts with 10% charge remaining using a 3 hour discharge rate, C/3. Thus, any equipment powered from the battery must be capable of handling a nearly 30% swing in the battery's voltage. Therefore, a flywheel having an unregulated voltage output could replace a battery for the same applications, but only the upper 30% (for example) of the operating speed during discharging of the flywheel would actually supply useable voltage to the load. However, because the energy stored in a flywheel is proportional to the square of the rotational speed, the upper 300% of the speed range accounts for 51% of the energy stored in the flywheel. From this, it could still require a flywheel with twice the size and cost to provide the same useable energy is a conventional regulated flywheel energy system. However, advantages and other embodiments that make this a desirable solution will be described later.

Figure 2:
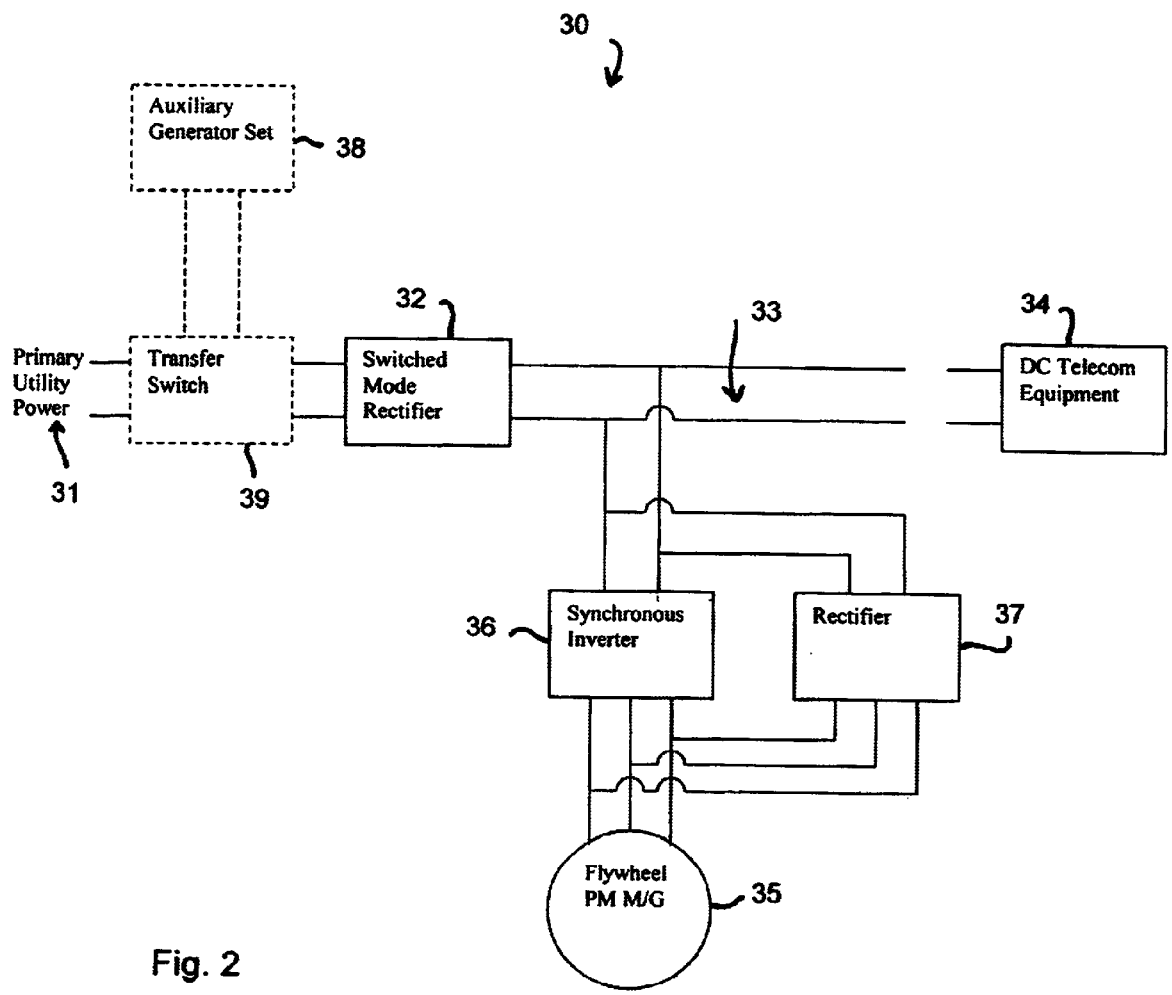
FIG. 2 is a schematic drawing of a power system using a flywheel device for prevention of power interruptions in accordance with the invention.

As shown schematically in FIG. 2, a power system 30 using a flywheel device for preventing power interruptions in accordance with the invention supplies uninterrupted DC power to a DC bus 33 to which DC telecommunication network equipment 34 is connected in the event of interruptions to power from primary utility power 31. The primary power 31 is typically rectified using a switched mode rectifier 32 to supply standard DC voltages such as typical 24 volts or −48 VDC. An uncontrolled rectifier could be used with the invention instead of the switched mode rectifier 32. In conventional network equipment systems, a string of batteries, not shown, floats across the DC bus 33. The batteries are charged from the DC bus 33 at roughly 56 volts and they supply power to the equipment 34 in the event of an interruption of primary power 31. In that case, the batteries discharge to roughly 42 volts. Because of the voltage swing of the batteries corresponding to their state of charge, the network equipment is designed to operate with that wide of a voltage swing. Many downstream types of equipment 34 have embedded DC-DC converters with a matching range to accomplish this task.

To increase the reliability of the power system, and to minimize the required maintenance, periodic replacement of the batteries, temperature sensitivity and unknown health condition of batteries, it would be desirable to replace the batteries with a flywheel energy storage device, such as the one shown schematically in FIG. 2, having a flywheel with permanent magnet excited motor/generator 35 connected in the power system 30, with a connection to the DC bus 33. A synchronous inverter 36 supplies synchronous AC power to accelerate the motor/generator 35 by converting power from the DC bus 33 from DC to AC. The synchronous inverter 36 preferably operates in closed loop mode, or is self synchronous, such that rotary position sensors in the motor, not shown, control the inverter power synchronization. Sensorless type synchronous inverters that use the armature coils in the motor/generator to determine the rotational position of the rotor could be used instead. During a loss of utility power 31, the flywheel motor/generator 35 supplies power to the DC bus 33 through a rectifier 37. Most synchronous inverters contain internal freewheeling diodes to protect the internal drive transistors and these typically act as a rectifier the same as rectifier 37. However, the rectifier 37 is preferably rated for higher power than the synchronous inverter so that the flywheel can be discharged at a faster rate than be charged, although this is may not be required in some applications. For example, if the charging and discharging rate were comparable in a given application, the synchronous inverter alone could be used to rectify the output power from the flywheel motor/generator 35, eliminating the need for the extra rectifier 37. However, it has been found that a significant amount of cost can be saved by accelerating the flywheel at a slower rate and thereby allowing use of a smaller and cheaper synchronous inverter. The flywheel motor/generator 35 supplies useable voltage to the DC bus 33 until the flywheel speed drops too low.

As the flywheel slows, the voltage it supplies to the DC bus 33 drops. To increase the amount of useable energy that the flywheel motor/generator 35 supplies to the DC bus 33, a combination of a low voltage drop in the motor/generator 35, and building the flywheel with sufficient inertia to reduce the rate of decay of the back emf is used. This is described in more detail in the following sections.

Figure 3:
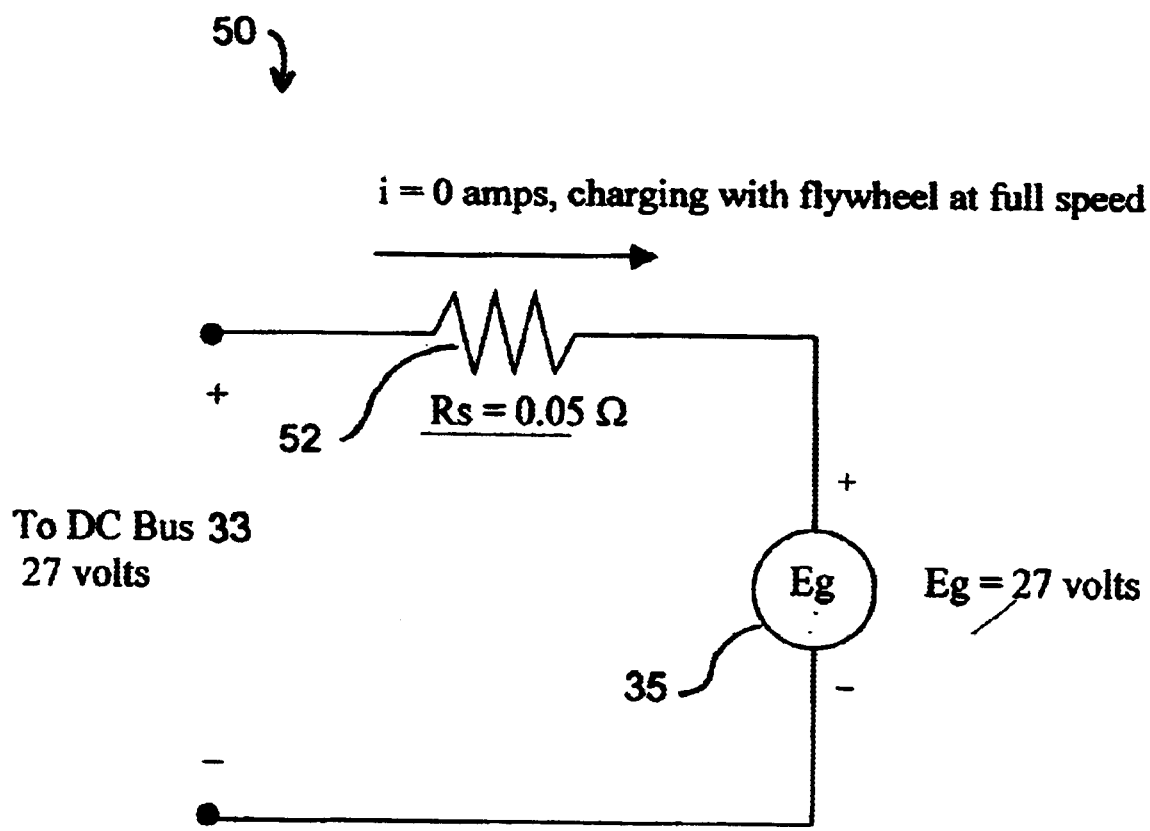
FIG. 3 is a schematic drawing of a corresponding circuit for a motor/generator when the flywheel is at full speed with no loss of utility power.

An analogue of the circuit for the motor/generator when the flywheel is at full speed with no loss of utility power is shown in FIG. 3. This example uses a 27 volt DC bus (24 volt nominal) which is used for wireless base stations. The circuit 50 is energized with voltage from the DC bus 33 that drives current through the motor/generator armature coil 52 having a resistance or impedance of 0.05 ohms and the back emf generated by the motor/generator 35. When the flywheel is fully charged and there is no interruption of the primary power, the charging current in the circuit 50 approaches zero. Therefore the flywheel accelerates until the back emf 53 is approximately equal to the voltage in the DC bus 33. In reality, some losses and drag exist so some small current does flow and the back emf from the motor/generator 35 is slightly less than the voltage in the DC bus voltage 33.

Figure 4:
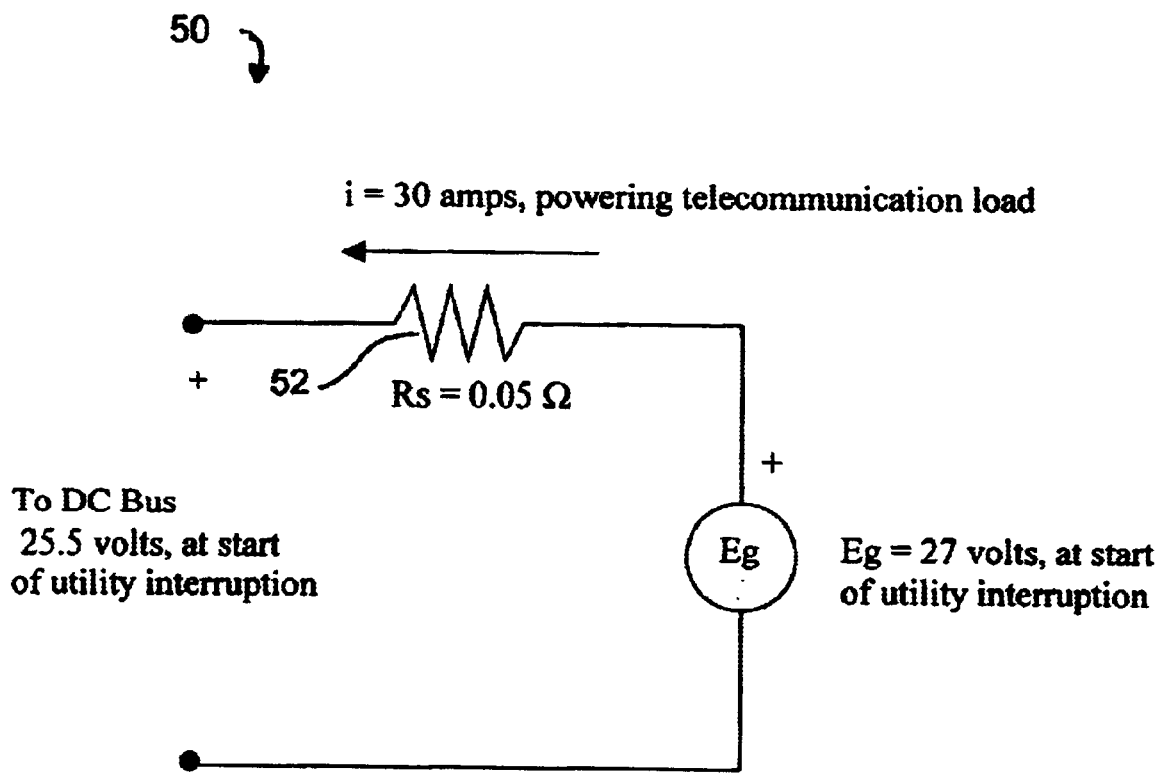
FIG. 4 is a schematic drawing of a corresponding circuit for a motor/generator when the flywheel is at full speed and a utility power interruption starts.

The analogue circuit 50 to the circuit for the motor/generator 35 when the flywheel is at full speed and a utility power interruption starts is shown in FIG. 4. When the interruption starts, the circuit 50 shows the motor/generator supplying power back to the DC bus 33. Because of the load on the DC bus, not shown, a high current is drawn from the motor/generator 35. In this illustrative example, the current is 30 amps. Unfortunately though, even at the initial start of the power interruption, the flywheel motor/generator 35 can not supply full voltage to the DC bus 33. The back emf from the motor/generator 35 is still at 27 volts because the speed has yet to drop. However, the voltage drop in the motor/generator armature coil resistance or impedance results in only 25.5 volts at the DC bus 33. As can be seen, minimizing the voltage drop in the motor/generator is desirable for extracting the most useable energy from the flywheel motor/generator.

Figure 5:
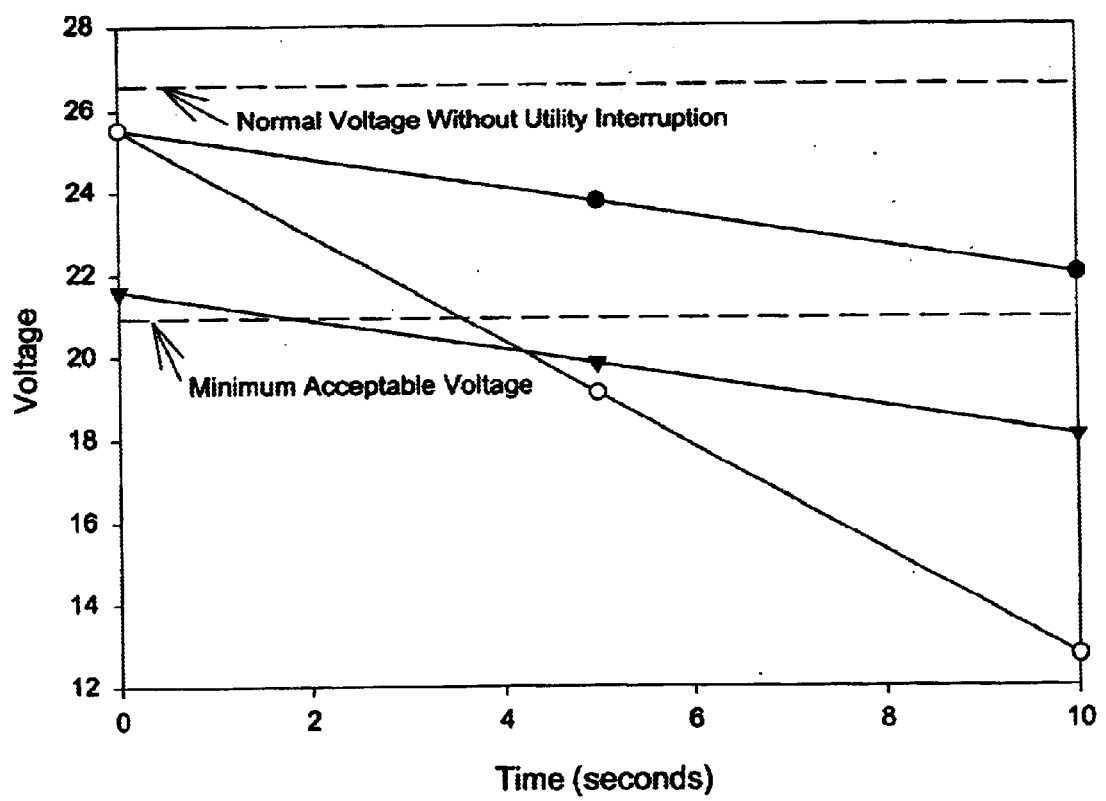
FIG. 5 is a plot of the DC bus voltage with three different flywheel motor/generator configurations.

FIG. 5 is a plot of voltage supplied to telecommunication equipment during a utility power interruption with three different device configurations. This example illustrates a flywheel system having the capacity to provide back up electrical power for 10 seconds to an 810 watt wireless base station in the event of a utility power interruption to the station. Obviously, the invention is not limited by this power level and back up power delivery time and could be used with flywheel systems providing up to several hundred kilowatts of power or with systems that provide back up energy for several hours. In the example, the first configuration, the most preferred one, the armature is wound with a very low armature coil resistance of only 0.5 ohms and uses a flywheel that stores 9 Wh at full speed. A ten second interruption to an 810 watt load would only use 2.25 Wh of energy. In the first configuration, the voltage supplied initially drops to 25.5 volts and then slowly decreases to 22 volts over the 10 second interruption as the flywheel is decelerated. Complete protection is provided and extra capacity is left to account for extra energy losses such as in the rectifier, wires and from friction. Rectifier voltage drops are usually between 0.3 to 1.0 volts.

The second configuration has a low armature coil resistance motor/generator with only 0.05 ohms, however in this case the flywheel stores only 3 Wh of energy. The initial voltage drop is again only to 25.5 volts. Unfortunately, the flywheel slows quickly and the provided voltage after 10 seconds is only 12.75 volts, which is below the minimum required. The configuration does support the load for slightly less than 4 seconds though.

The third configuration performs the worst. The armature coil stator resistance is 0.18 ohms and thus the initial voltage drop is to 21.6 volts. The device has 9 Wh of energy storage but unfortunately it barely supports the load before the output drops below the required voltage.

The three plots illustrate that the motor/generator of the invention should be wound with a very low armature resistance or impedance and the flywheel should have sufficient extra inertia to reduce the rate of decay of the flywheel's speed. It is one aspect of the invention that, to insure a low voltage drop in the motor/generator, the armature coils have an electrical resistance per phase, R, in ohms, represented by the following expression:

$$R \leq 0.15 \ (V/I),$$

or more preferably, $$R \leq 0.075 \ (V/I)$$

where V is the normal DC bus voltage, in volts, during normal operation of the primary utility power the DC bus, and I is the normal current, in amps, through the DC bus during normal operation of the primary utility power.

In a second embodiment, to reduce the rate of slowing of the flywheel, the flywheel is designed with a rotational moment of inertia, IN, in kg m² for capability of supplying useable power to the DC bus for a time, T, in seconds, and a normal operating speed, w, in radians per second, such that:

$$IN \geq 3.6 \ V I \ T/w^2,$$

or more preferably:

$$IN \geq 4.5 \ V I \ T/w^2$$

Alternatively, the flywheel device delivers useable power to the DC bus only in the speed range from the normal operating speed to some lower speed that is greater than 60% of the normal operating speed.

Figure 6:
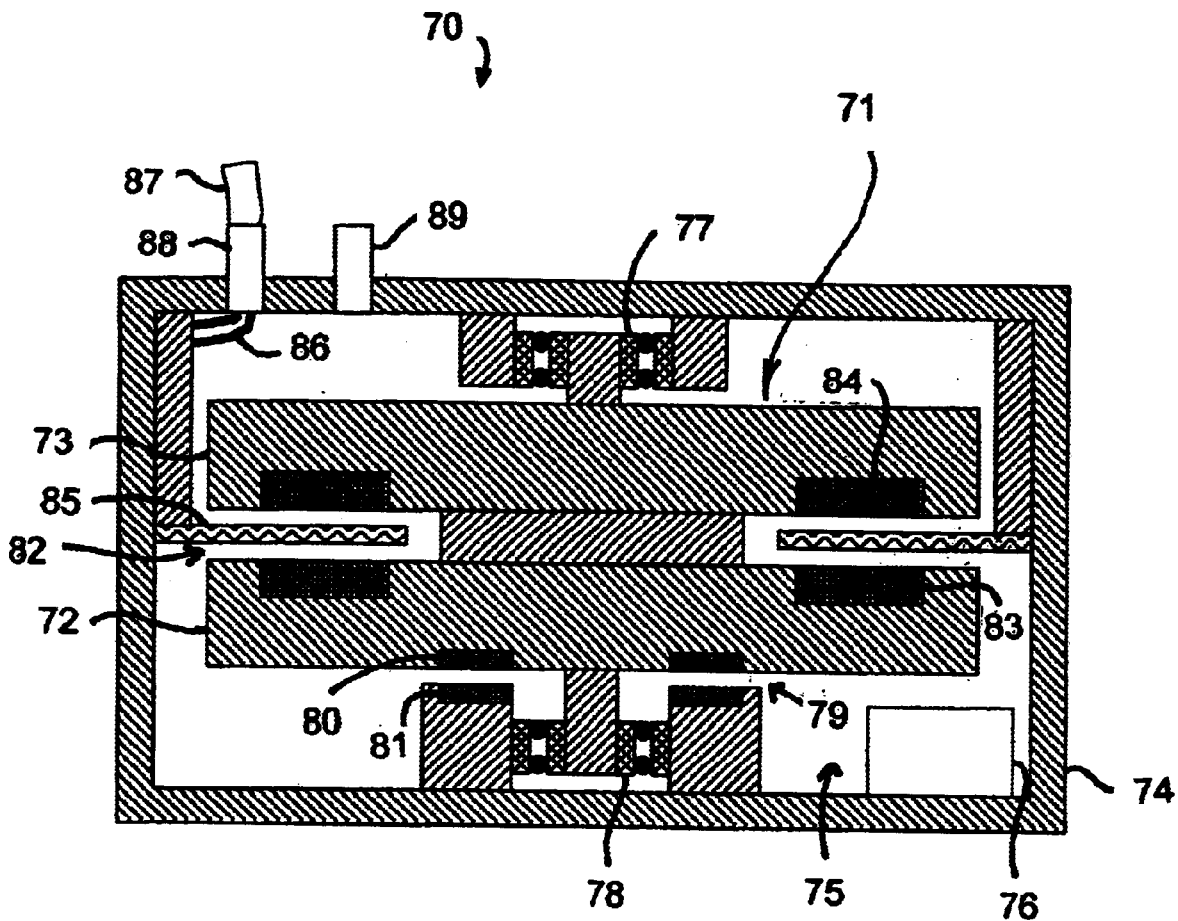
FIG. 6 is a schematic drawing of a flywheel motor/generator for use in preventing power interruptions in accordance with the invention.

Many possible designs for a flywheel motor/generator can be constructed for use with the invention. A schematic drawing of one such flywheel motor/generator for use in preventing power interruptions in accordance with the invention is shown in FIG. 6. The flywheel system 70 includes a flywheel 71 that rotates in a drag reducing atmosphere within a chamber 75 in a sealed container 74. For low speed or small size flywheels helium can be used as the drag-reducing atmosphere. A vacuum is preferred for larger and high speed flywheels. The vacuum in the chamber 75 would be maintained with a vacuum pump 76 that can be either a mechanical type pump or more preferably a getter vacuum pump. When a getter vacuum pump 76 is used, a pump out port 89 can be used to initially pull the vacuum with an external pump, not shown, and to seal the container 74.

The flywheel 71 can be constructed from composite materials or from metal such as steel. Steel is much heavier but it is substantially lower in cost and effective for storing energy economically. The flywheel 71 is supported for rotation by upper and lower bearings 77 and 78. When mechanical bearings 77, 78 are used, the majority of the weight of the flywheel is preferably carried by the use of a magnetic bearing 79, to greatly lighten the load on the mechanical bearings 77, 78 and extend their life. As shown, the magnetic bearing 79 uses rotor and stator magnets 80, 81 in axial repulsion. Other designs of magnetic bearings, mechanical bearings or other bearing systems could also be used.

In the configuration shown in FIG. 6, the motor/generator 82 is integrated with the flywheel 71. The flywheel 71 is constructed of upper and lower vertically spaced-apart disks 73, 72 that are assembled to form an internal motor/generator 82. Permanent magnet segments 84 and 83 are attached to the disks 73, 72 to provide magnetic fields in the vertical airgap between the two disks 73, 72. Armature coils 85 are inserted into the airgap between the two disks 73, 72 so that they intersect the lines of flux in the magnetic fields as the flywheel rotates in its bearings 77, 78 about a vertical axis. Application of synchronous power to the armature coils 85 accelerates the flywheel 71. Likewise, the armature coils 85 extract energy during discharging by the generated back emf supplying current to the DC bus through a rectifier as shown in FIG. 2.

The configuration of the motor/generator shown in FIG. 6 has several advantages. The armature coils 85 have air cores, which significantly reduce their inductance and impedance and they reduce the magnetic losses that would occur in the cores. The flywheel can be rotated efficiently to higher speeds and therefore can have reduced diameter for the same flywheel stresses. Also, the motor/generator construction has magnets on each side of the armature coil. Magnet material, whether ceramic, NdFeB or other types, has lower electrical resistivity and magnetic permeability than steel, thereby reducing eddy current and hysteresis losses without the use of laminations. The wires 86 from the armature coils 85 exit the container 74 through a vacuum feedthrough 88 and connect to external cabling.

Figure 7:
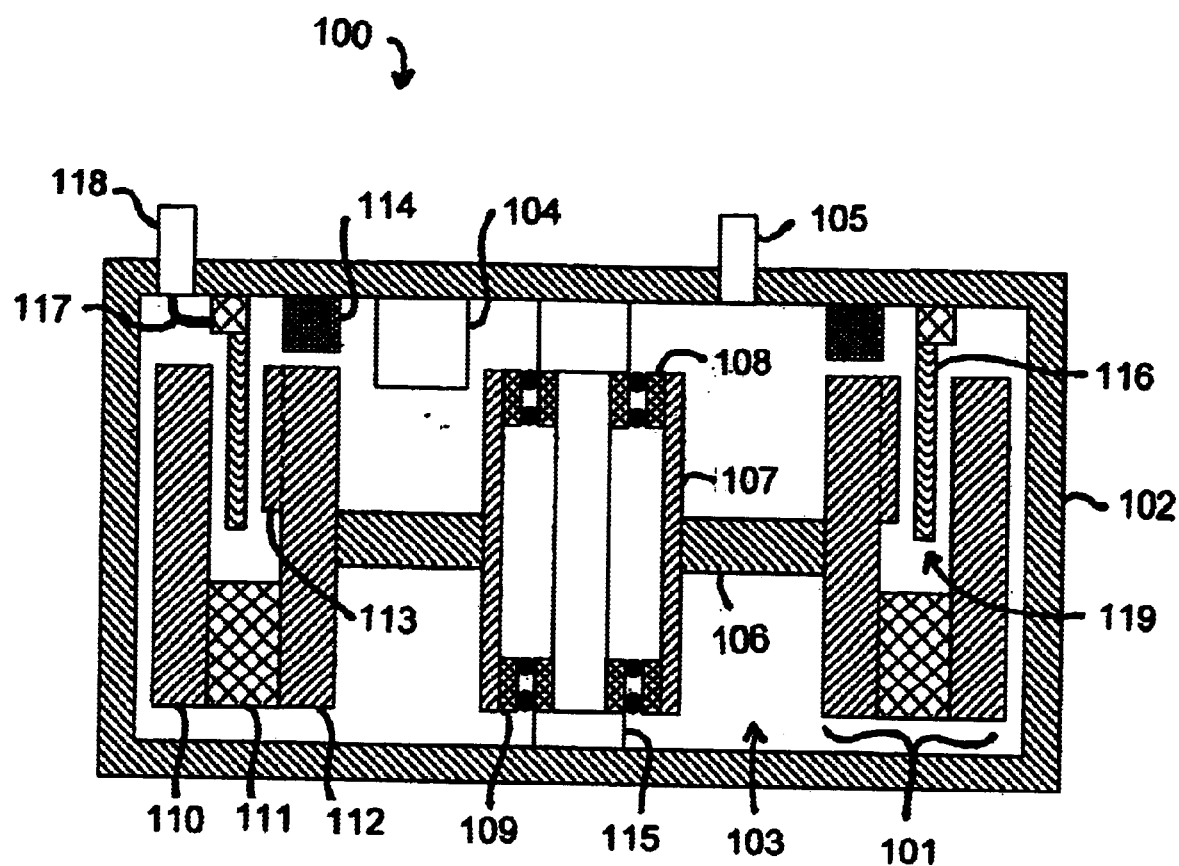
FIG. 7 is a schematic drawing of an alternate configuration flywheel motor/generator for use in preventing power interruptions in accordance with the invention.

A schematic drawing of an alternate configuration flywheel motor/generator for use in preventing power interruptions in accordance with the invention is shown in FIG. 7. This configuration eliminates the need for rotating magnets, which in some cases can limit the operation speed. The flywheel system 100 is comprised of a flywheel 101 that rotates inside an evacuated chamber 103 within a sealed container 102. The vacuum in the chamber 103 is maintained with a getter vacuum pump 104 and a pull down and pinch off port 105 provides a method for establishing the initial vacuum and sealing the container. The flywheel 101 is supported by a hub 106 that connects to a central tube 107 and rotates about a center shaft 115. Mechanical bearings 108, 109 journal the tube 107 about the shaft 115. Other hubs and bearing connection methods could alternatively be used.

The motor/generator 119 is integrated with the flywheel 101. The flywheel 101 is constructed from inner and outer steel rims 110, 112 that are separated by a nonmagnetic spacer 111, preferably made from aluminum. A stationary permanent magnet 114 attached to the inside of the container 102 drives flux axially into the inner rim 112, radially outward through the outer rim 110, and back to the container 102. Between the inner and outer rims 112, 110 is located air airgap armature coils 116 such that flux from the permanent magnet 114 passes through them. The inner rim 112 has protrusions 113 around the circumference to concentrate the flux in an array of radial rays that rotate with the flywheel 101 and induce a back emf in the armature coils 116 upon rotation of the flywheel 101. The permanent magnet 114 also serves a dual purpose in that it removes most of the load from the mechanical bearings 108, 109, providing dramatically increased bearing life. Wires 117 from the armature coils 116 exit the chamber 103 through a vacuum tight feedthrough 118. Other types of permanent magnet motor/generator flywheel combinations could also be used. A separate permanent magnet motor and generator could alternatively be used as well as non-air core armature coils, but without all of the benefits of higher efficiency and reduced size of the configurations shown.

Figure 8:
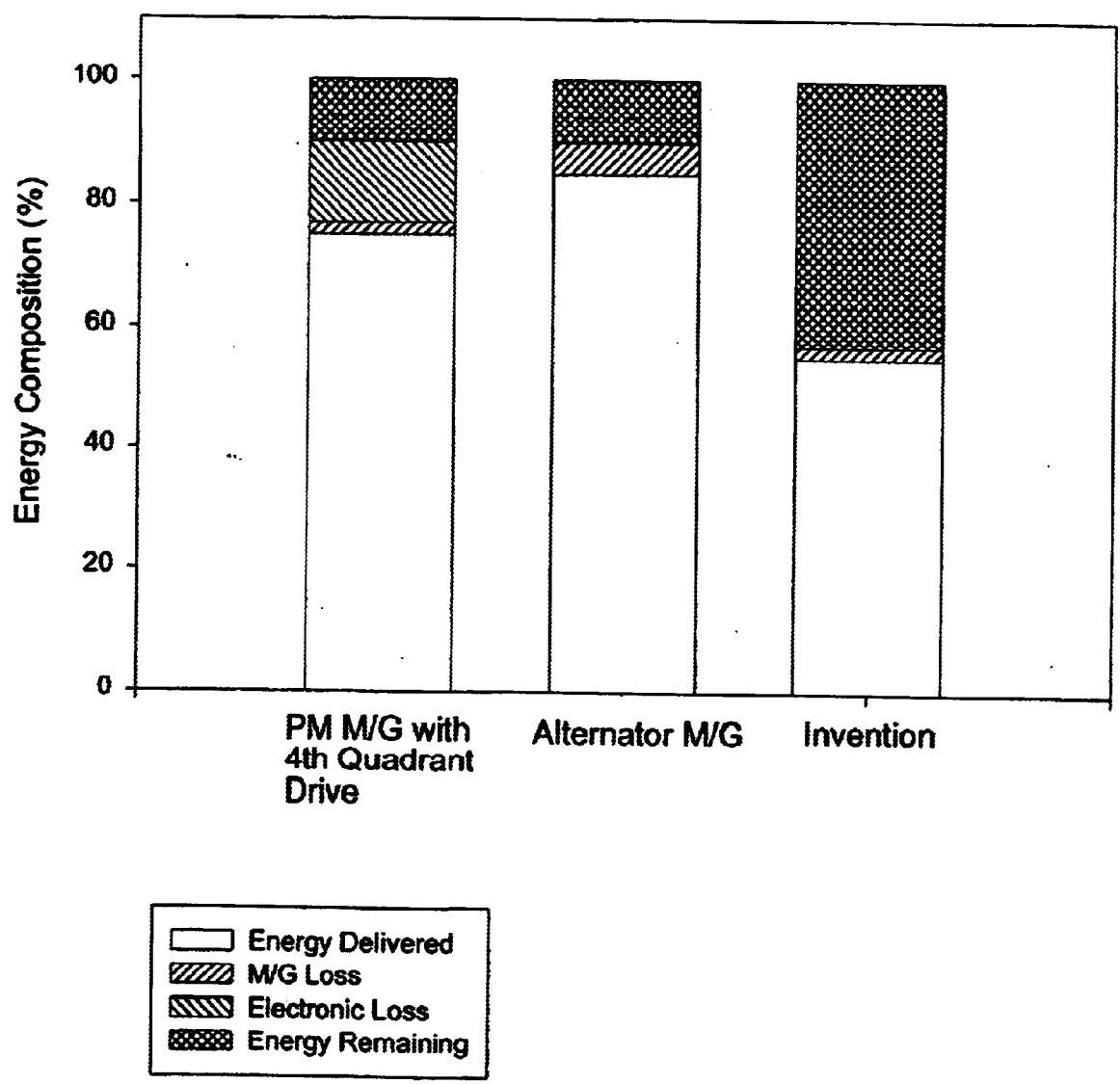
FIG. 8 is a comparison of flywheel energy compositions from discharging of various configurations of flywheel systems.

An estimated comparison of flywheel energy compositions from discharging of various configurations of flywheel systems is shown in FIG. 8. The first configuration uses a permanent magnet motor/generator and has output voltage regulation through $4^{th}$ quadrant operation of the motor drive. The second configuration uses an alternator type motor/generator in which output voltage regulation is achieved by varying the power to the field coil. The third configuration illustrates the invention, using a permanent magnet motor/generator and no output voltage regulation The first configuration extracts roughly 90% of the energy from the flywheel during discharging. However, the electronic switching losses in the output regulation and the motor/generator losses combine to subtract 15% of that energy so that the flywheel device delivers only 75% of the stored energy to the load. The second configuration eliminates the electronic switching losses by using a field coil for regulation. The second configuration also extracts roughly 90% of the energy from the flywheel. The motor/generator is less efficient, but without the switching losses, the flywheel device delivers roughly 85% of its stored energy to the load. The third configuration, which is the invention, extracts 57% of the energy from the flywheel by using the fact that the downstrean equipment, in this example, can operate with a 25% reduction in voltage. Without switching losses and with a high efficiency motor/generator, the flywheel device still only delivers roughly 55% of its stored energy to the load. The invention might seem like a poor design using this as the only design criterion.

Figure 9:
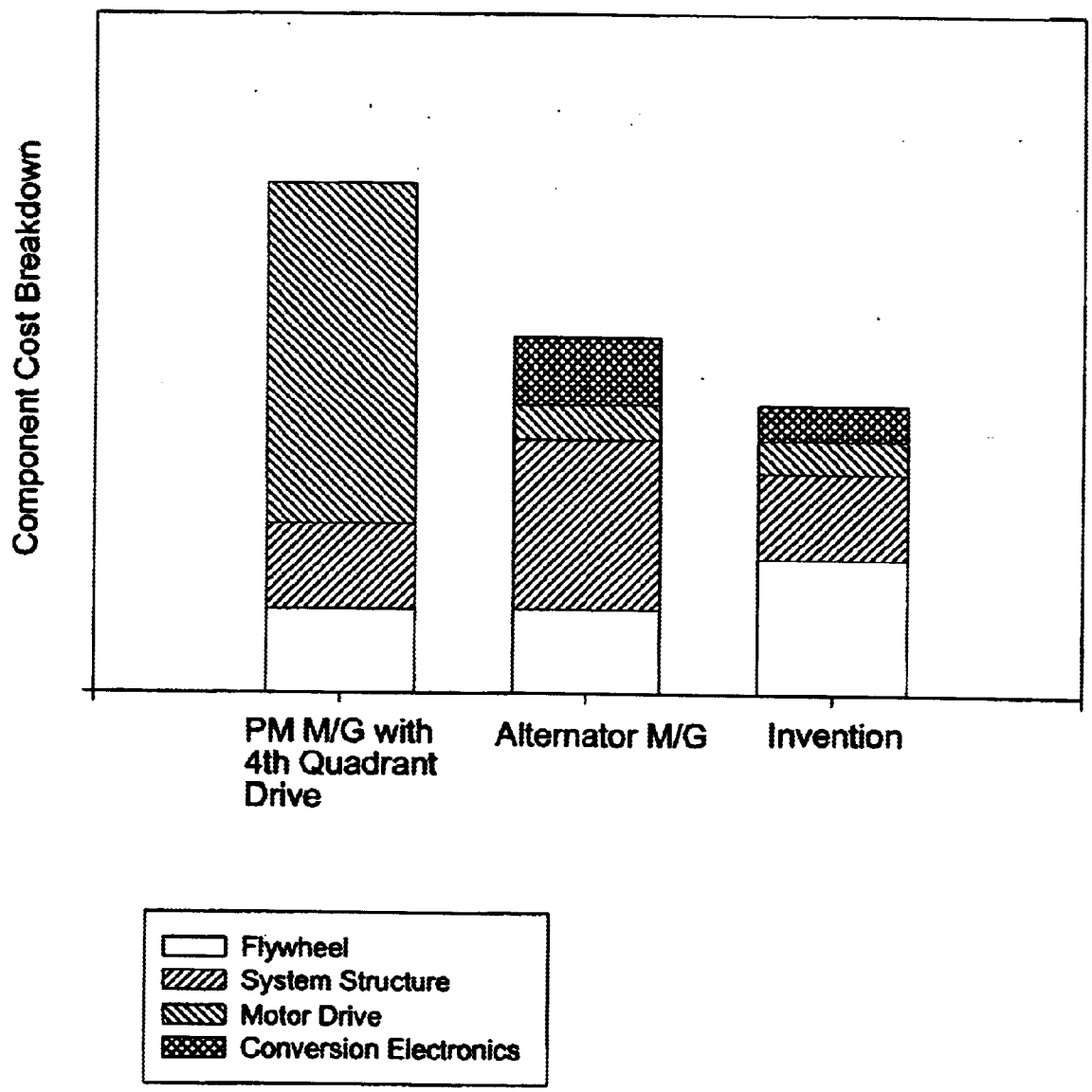
FIG. 9 is a comparison of flywheel system component costs of various configurations of flywheel systems.

Depending on the specific design application of the flywheel system the invention can provide a lower total system cost and increased reliability. This is not true in all flywheel applications, but it is particularly true in applications where the flywheel accounts for a smaller portion of the total system cost, where the cost of power electronics would be significant and or where the size and weight of the flywheel is not important. As an example, in many short term ride flywheel systems, the flywheel only supplies energy for less than a minute and the power delivered is very high. The result in this case is that the stored energy is small compared to the powered delivered and hence the power electronics are a larger portion of the system cost compared to the flywheel. A comparison of estimated flywheel system component costs of the three previous configurations of flywheel systems is shown in FIG. 9. In the first configuration, the motor drive, which performs output voltage regulation by $4^{th}$ quadrant operation, is the largest portion of the system cost. The flywheel and system structure are much lower. In the second configuration, the flywheel has approximately the same cost. The system structure is more expensive accounting for an efficient alternator construction. The motor drive is much lower in cost than the first configuration because it only is used to accelerate the flywheel and at low power. However, some added costs are incurred for output regulation to control the field coil. The alternator design configuration is however 30% lower in cost than the first configuration. In order for the invention to supply the same amount of useable energy to the load, the flywheel must be made larger to store more energy. The flywheel itself is more expensive that the previous configurations. The system structure is comparable with the first configuration and lower in cost than the alternator design. The motor drive is low cost because it is only used for acceleration and some costs are added for the conversion electronics, which is simply a rectifier. The result in this case is only 20% reduction in total system costs over the alternator design and a 44% reduction over the $4^{th}$ quadrant operated permanent magnet motor design. This is despite the fact that the system extracts significantly less percentage energy from the flywheel and the flywheel is much larger.

The larger flywheel could be expected to experience greater stresses and suffer fatigue effects sooner than a smaller flywheel. However, the larger flywheel in the operation envisioned for this invention is not discharged to the degree that flywheels in convention flywheel energy storage systems are. Accordingly, the flywheel does not see the same extreme stress cycling as in conventional flywheel energy storage systems, so the fatigue effects are greatly postponed.

Figure 10:
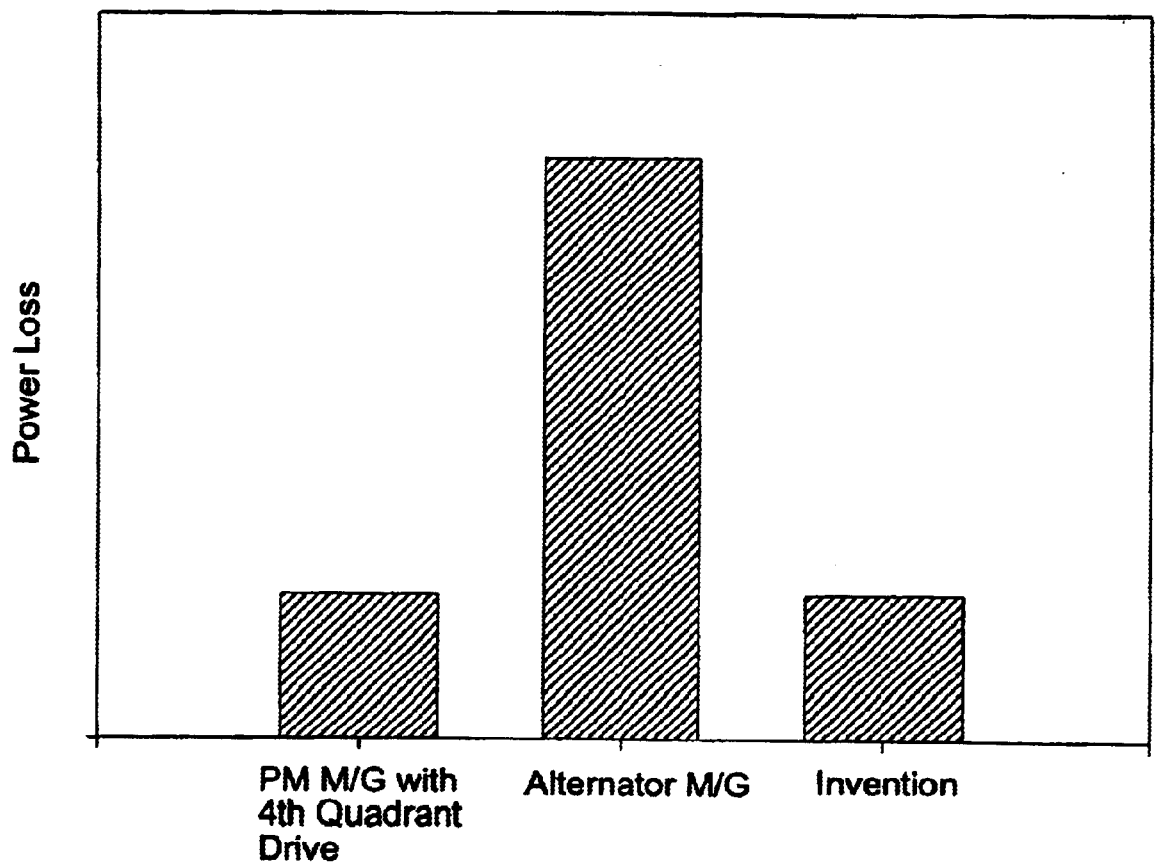
FIG. 10 is a comparison of estimated standby power loss for various configurations of flywheel systems.

Another advantage of the invention is the low standby power loss. A comparison of estimated standby power loss for the three configurations of flywheel systems is shown in FIG. 10. The permanent magnet motor/generator designs of the first configuration and the invention operate with approximately 25% of the power consumption of the alternator design. The alternator configuration consumes continuous power to its field coil to maintain on line energy protection and the efficiency is lower than the permanent magnet motor/generators. The lack of output conversion can also increase the reliability of the flywheel energy device.

Figure 11:
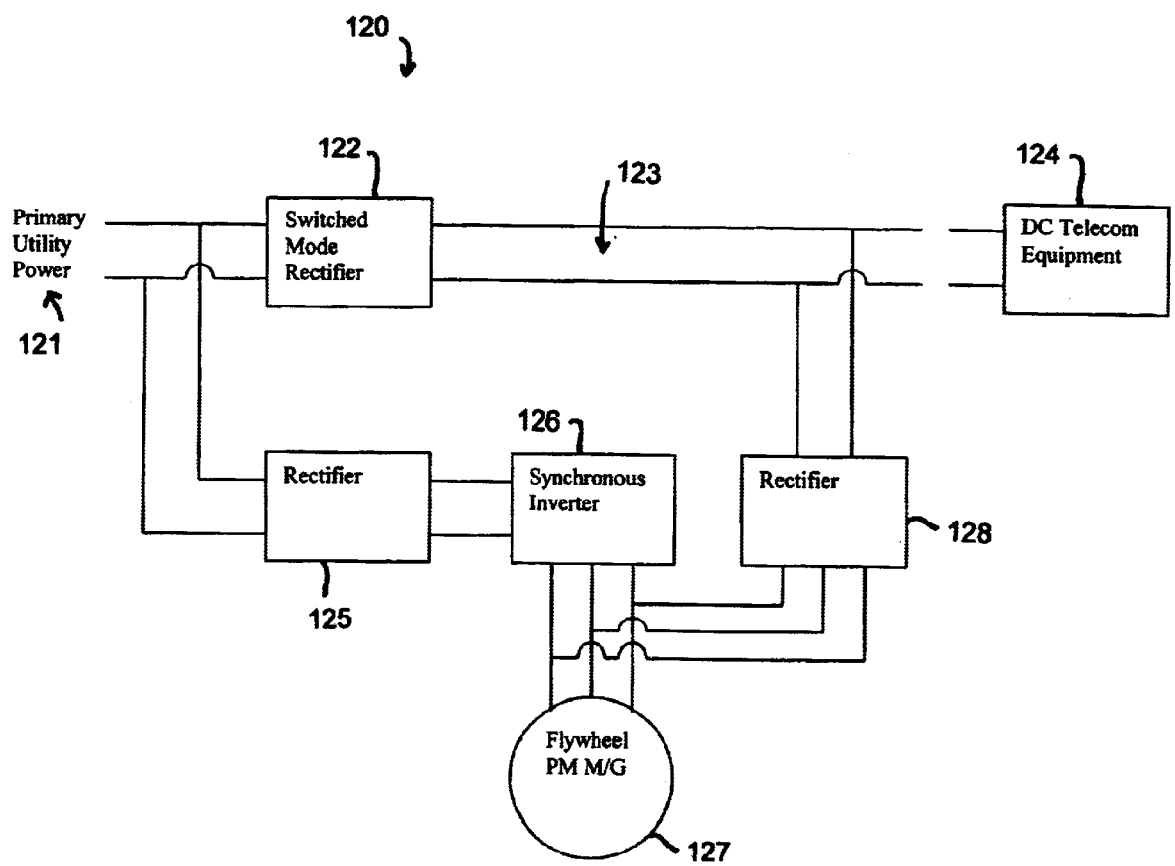
FIG. 11 is a schematic drawing of an alternate configuration power system using a flywheel device for prevention of power interruptions in accordance with the invention.

A schematic drawing of an alternate configuration power system using a flywheel device for prevention of power interruptions in accordance with the invention is shown in FIG. 11. The power system 120 takes in utility primary power from the power grid or other power source 121 and supplies DC power to a DC equipment load 124 by connection to a DC bus 123. A switched mode rectifier 122 connected to the primary power converts the AC to DC for the DC bus 123. The DC bus is protected against interruption of power by a flywheel motor/generator 127. The armature coils of the permanent magnet motor/generator 127 are connected to the DC bus through a rectifier 128, such that the DC bus voltage drops as the speed of the flywheel slows. In this configuration, power for charging the flywheel motor/generator 127 to full speed is supplied directly through a rectifier 125 from the primary power source 121 instead of through the switched mode rectifier 122. This extends the life of the switched mode rectifier 122. For charging, the rectifier 125 rectifiers the primary power from the source 121 and supplies it to a synchronous inverter 126. The synchronous inverter 126 preferably operates in a closed loop mode so that it never loses synchronization with the motor/generator despite starts and stops of charging power.

The output voltage from the rectifier 128 to the DC bus 123 is preferably slightly below the DC bus voltage so that the switched mode rectifier carries the load of the telecom equipment 124 in normal operation of the primary power 121. However, another operation method could alternatively be used to allow the flywheel to be able to deliver more energy to the DC bus 123. The flywheel motor/generator 127 could be charged to a slightly higher voltage than the DC bus voltage but still in the accepted range useable by the equipment load 124. A switch, not shown, could be placed between the rectifier 128 and the DC bus 123 to switch on the power from the flywheel motor/generator 127 to the DC bus 123 when the primary power 121 is interrupted. This function could also be accomplished by the rectifier 128 being controllable to turn on or off. The switching of the flywheel power on or off to the DC bus 123 may result in a glitch interruption of power and may not be preferable for all applications.

Figure 12:
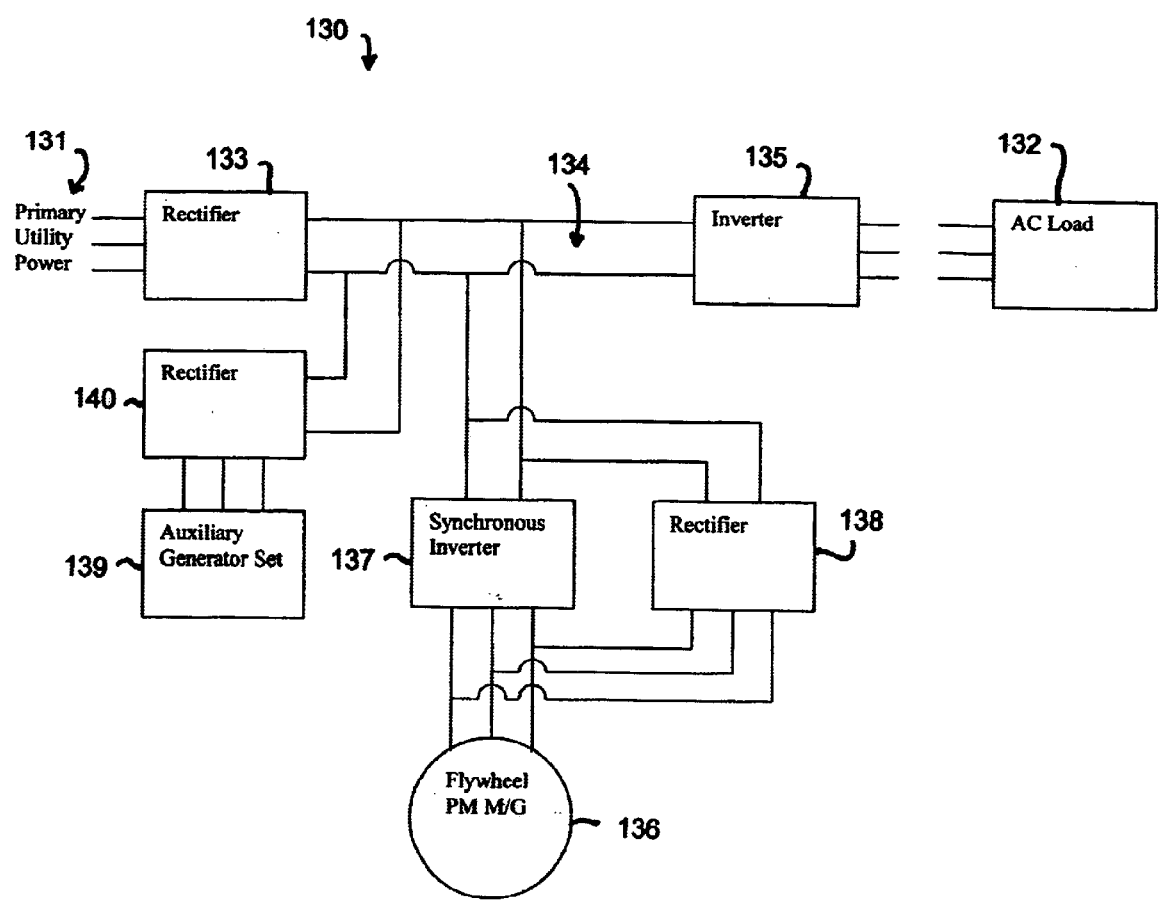
FIG. 12 is a schematic drawing of a second alternate configuration power system using a flywheel device for prevention of power interruptions in accordance with the invention.

The invention is applicable for use with DC powered loads that are powered directly from the DC bus, and the protection of power afforded by the invention to a DC bus can also be used in AC power systems. A schematic drawing of a second alternate configuration power system using a flywheel device for prevention of power interruptions in accordance with the invention is shown in FIG. 12. This configuration shows a typical double conversion type uninterruptible power supply but using the invention instead of conventional batteries. The power system 130 connects to primary utility power 131 and supplies uninterrupted power to an AC load 132. The primary power 131 is converted to a DC bus 134 through a rectifier 133. The power from the DC bus 134 is then inverted to supply the AC load 132 through an inverter 135. The inverter 135 can be a static or rotary type. During an interruption of primary power 131, power is supplied to the DC bus 134 by the flywheel motor/generator 136. The permanent magnet motor/generator 136 is accelerated by a synchronous inverter 137 that is powered from the DC bus 134. During a loss of primary power 131, the back emf from the motor/generator 136 is rectified by the rectifier 138 and is supplied back to the DC bus 134. The voltage of the DC bus 134 falls as the flywheel speed slows, however since the inverter was designed to operate from convention battery power, it can handle some variation of input voltage corresponding with batteries. If the duration of the primary power interruption is extended, an auxiliary generator set 139 can be started to supply continuous power to the AC load 132. As shown, power from the generator set 139 is rectified by a rectifier 140 and supplied to the DC bus 134. However, other generator set connections could be used such as connection to the primary power side of the rectifier 133 through use of a transfer switch or alternatively connection to the AC load 132.

Figure 13:
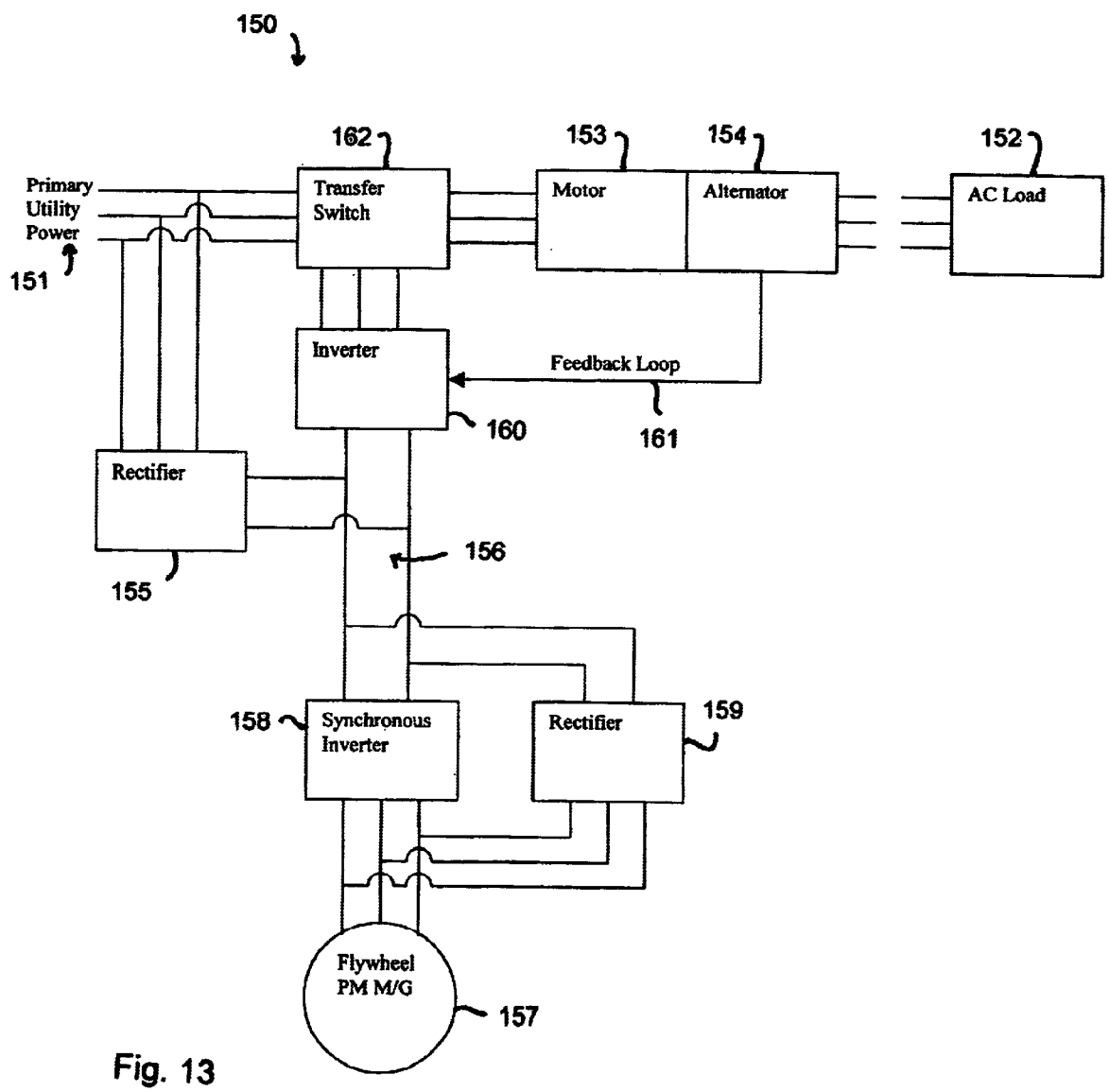
FIG. 13 is a schematic drawing of a third alternate configuration power system using a flywheel device for prevention of power interruptions in accordance with the invention.

The invention can also be used in power systems employing power conditioners. A schematic drawing of a third alternate configuration power system using a flywheel device for prevention of power interruptions in accordance with the invention is shown in FIG. 13. The power system 150 is connected to primary utility power 151 and supplies conditioned and continuous power to an AC load. The primary power 151 connects to a motor 153 that drives an alternator 154, which supplies conditioned power to the AC load. The combination motor 153 and alternator 154 corrects the power factor and reduces harmonics as is well known in the art. During an interruption of primary power 151, the inertia of the motor 153 and alternator 154 continues to provide energy to the load 152 for a short period of time. The transfer switch 162 switches off the connection between the motor 153 and the primary power 151. It also switches on the connection of the motor 153 to receive power from the flywheel motor/generator 157. The flywheelmotor/generator has high inertia and can rotate at higher speed than the motor 153 and alternator 154 which must rotate at line synchronous speed. The flywheel motor/generator 157 therefore stores sufficient energy to prevent an interruption of power to the AC load 152 for a more extended period of time. The flywheel motor/generator using a permanent magnet excited motor/generator is charged from utility power 151 through a rectifier 155 that supplies power to a DC bus 156. A synchronous inverter 158 accelerates the flywheel 157 from the power of the DC bus 156. When the primary power 151 fails, the back emf of the permanent magnet motor/generator 157 supplies power to the DC bus 156 through the rectifier 159. As the flywheel speed slows, the DC bus voltage drops. An inverter 160 connected to the DC bus 156 supplies AC power to the motor 153 through the transfer switch 162. A feedback loop 161 to the inverter 160 from the alternator 154 maintains synchronization.

Obviously, numerous other modifications, combinations and variations of the preferred embodiments described above are possible and will become apparent to those skilled in the art in light of this specification. For example, many functions and advantages are described for the preferred embodiments, but in some uses of the invention, not all of these functions and advantages would be needed. Therefore, I contemplate the use of the invention using fewer than the complete set of noted functions and advantages. Moreover, several species and embodiments of the invention are disclosed herein, but not all are specifically claimed, although all are covered by generic claims. Nevertheless, it is my intention that each and every one of these species and embodiments, and the equivalents thereof be encompassed and protected within the scope of the following claims, and no dedication to the public is intended by virtue of the lack of claims specific to any individual species. Accordingly, it is expressly intended that all these embodiments, species, modifications and variations, and the equivalents thereof are to be considered within the spirit and scope of the invention as defined in the following claims, wherein

I claim:

1. A device for prevention of power interruptions to a DC bus, comprising:

a flywheel supported for rotation about an axis of rotation on a bearing system in a drag reducing internal atmosphere inside a container; said flywheel having a large moment of inertia about said rotation of inertia;

an integral brushless permanent magnet excited motor/generator having low resistance armature coils coupled to said flywheel for accelerating and decelerating said flywheel for storing and retrieving energy stored as rotational inertia of said flywheel;

a closed loop operated synchronous inverter for supplying synchronous power to armature coils of said motor/generator for accelerating said flywheel;

a rectifier connecting said armature coils of said motor/generator to said DC bus for supplying unregulated voltage power to said DC bus during an interruption of primary utility power;

whereby the voltage of said DC bus falls as the speed of said flywheel slows during its discharge of useable energy to said DC bus, the amount of said usable energy delivered to said DC bus during a utility power interruption is maximized by a combination of a low voltage drop in said armature coils of said motor/generator and by sufficient inertia in said flywheel to reduce rates of decay of said motor/generator back emf.

2. A device for prevention of power interruptions to a DC bus as described in claim 1 wherein:

said armature coils have an electrical resistance per phase, R, in ohms, represented by the following expression:

$$R \leq 0.15 \, (V/I)$$

wherein V is the normal DC bus voltage during normal operation of said primary utility power, in volts; and I is normal current through said DC bus during normal operation of said primary utility power, in amps.

3. A device for prevention of power interruptions to a DC bus as described in claim 1 wherein:

said armature coils have an electrical resistance per phase, R, in ohms, represented by the following expression:

$$R \leq 0.075 \, (V/I)$$

wherein V is the normal DC bus voltage during normal operation of said primary utility power, in volts; and I is normal current through said DC bus during normal operation of said primary utility power, in amps.

4. A device for prevention of power interruptions to a DC bus as described in claim 2 wherein:
   said DC bus has normal DC bus voltage during normal operation of said primary utility power, V, in volts and normal current through said DC bus during normal operation of said primary utility power, I, in amps and is capable of supplying useable power to said DC bus for a time, T, in seconds;
   said flywheel has a rotational moment of inertia, IN, in kg m², and normal operating speed, w, in radians per second, such that:

$IN \geq 3.6 VIT/w^2$.

5. A device for prevention of power interruptions to a DC bus as described in claim 3 wherein:
   said DC bus has normal DC bus voltage during normal operation of said primary utility power, V, in volts and normal current through said DC bus during normal operation of said primary utility power, I, in amps and is capable of supplying useable power to said DC bus for a time, T, in seconds;
   said flywheel has a rotational moment of inertia, IN, in kg m², and normal operating speed, w, in radians per second, such that:

$IN \geq 4.5 VIT/w^2$.

6. A device for prevention of power interruptions to a DC bus as described in claim 3 wherein:
   said brushless permanent magnet excited motor/generator comprises air core armature coils.

7. A device for prevention of power interruptions to a DC bus as described in claim 3 wherein:
   said DC bus is connected to and powers distributed telecommunication network equipment.

8. A device for prevention of power interruptions to a DC bus as described in claim 3 wherein:
   said DC bus supplies power to an inverter for powering AC loads.

9. A device for prevention of power interruptions to a DC bus as described in claim 3 wherein:
   said flywheel is constructed primarily of steel.

10. A device for prevention of power interruptions to a DC bus as described in claim 9 wherein:
    said bearing system comprises rolling element mechanical bearings.

11. A device for prevention of power interruptions to a DC bus as described in claim 3 wherein:
    said motor/generator supplies more than 100 kilowatts of power to said DC bus during an interruption of said primary utility power.

12. A device for prevention of power interruptions to a DC bus as described in claim 3 wherein:
    said flywheel provides said useable power to said DC bus for a maximum duration that is less than 5 minutes.

13. A device for prevention of power interruptions to a DC bus as described in claim 1 wherein:
    said closed loop operated synchronous inverter receives power for acceleration of said flywheel from said DC bus.

14. A device for prevention of power interruptions to a DC bus as described in claim 1 further comprising:
    an auxiliary power generator for providing power to said output load if said duration of an interruption of said primary utility power is extended beyond a predetermined period within the energy capacity of said flywheel.

15. A device for prevention of power interruptions to a DC bus as described in claim 14 wherein:
    said predetermined period is less than 60% of said energy capacity of said flywheel.

16. A device for prevention of power interruptions to a DC bus as described in claim 1 wherein:
    said flywheel device delivers useable power to said DC bus only in a speed range from said normal operating speed to some lower speed that is greater than 60% of the normal operating speed.

17. A device for prevention of power interruptions to a DC bus as described in claim 1 wherein:
    said flywheel stores energy at a normal operating speed that is more than 1.8 times the amount of useable energy that it can deliver to said load.

18. A method for preventing power to a DC bus wherein:
    supporting a flywheel for rotation on a bearing system in a drag reducing internal atmosphere inside a sealed container;
    accelerating and decelerating said flywheel for storing and retrieving energy with an integral brushless permanent magnet excited motor/generator;
    delivering synchronous power to armature coils of said motor/generator by a closed loop operated synchronous inverter to accelerate said motor/generated; and
    delivering unregulated voltage power to said DC bus from said motor/generator through a rectifier that connects said armature coils of said motor/generator to said DC bus during an interruption of primary utility power;
    whereby, said unregulated voltage of said DC bus falls as said flywheel slows during discharge of useable energy therefrom to said DC bus, and said device increases the amount of said usable energy delivered to said DC bus during a utility power interruption by the combination of having a low voltage drop in said armature coils of said motor/generator and by said flywheel having sufficient inertia to reduce the rate of decay of the back emf of said motor/generator.

19. A device for preventing power interruptions to a DC bus normally supplied by primary utility power, comprising:
    a flywheel supported on bearings for rotation inside a chamber having a drag reducing atmosphere within a container, said flywheel having a moment of inertial about said axis of rotation the is less than $4.5 V I T/w^2$, where V is voltage in volts normally supplied to said said DC bus during normal operation of said primary utility power, and I is current in amps through said DC bus during normal operation of said primary utility power, and T is time in seconds during which said device is capable of supplying useable power to said DC bus, and w, in radians per second, is the normal fully charged operating speed of said flywheel;
    an integral brushless permanent magnet excited motor/generator for accelerated and decelerated said flywheel for storing and retrieving energy, said motor/generator having armature coils with an electrical resistance per phase that is less than 0.15 (V/I), where V is normal DC bus voltage during normal operation of said primary utility power, in volts, and I is normal current through said DC bus during normal operation of said primary utility power, in amps;

a closed loop operated synchronous inverter for delivering synchronous electrical power to armature coils of said motor/generator for accelerating said motor/generator;

a rectifier connecting said armature coils of said motor/generator to said DC bus;

whereby, upon an interruption of primary utility power, said motor/generator supplies unregulated voltage power to said DC bus through said rectifier, and said voltage of said unregulated voltage power to said DC bus falls as said flywheel slows during discharge of useable energy from said flywheel through said motor/generator to said DC bus, said device delivering an amount of usable energy to said DC bus during a utility power interruption that is maximized by the combination of a low voltage drop in said armature coils, and by said flywheel having sufficient inertia to reduce the rate of decay of the back emf of said motor/generator.

20. A device for preventing power interruptions to a DC bus as defined in claim 19, wherein:

said flywheel, rotating at a normal fully charged operating speed, stores energy at a speed that is more than 1.8 times the amount of useable energy that it can deliver to said load, and said usable amount of energy is less than 60% of the total energy capacity of said flywheel.

* * * * *